United States Patent Office 2,827,989
Patented Mar. 25, 1958

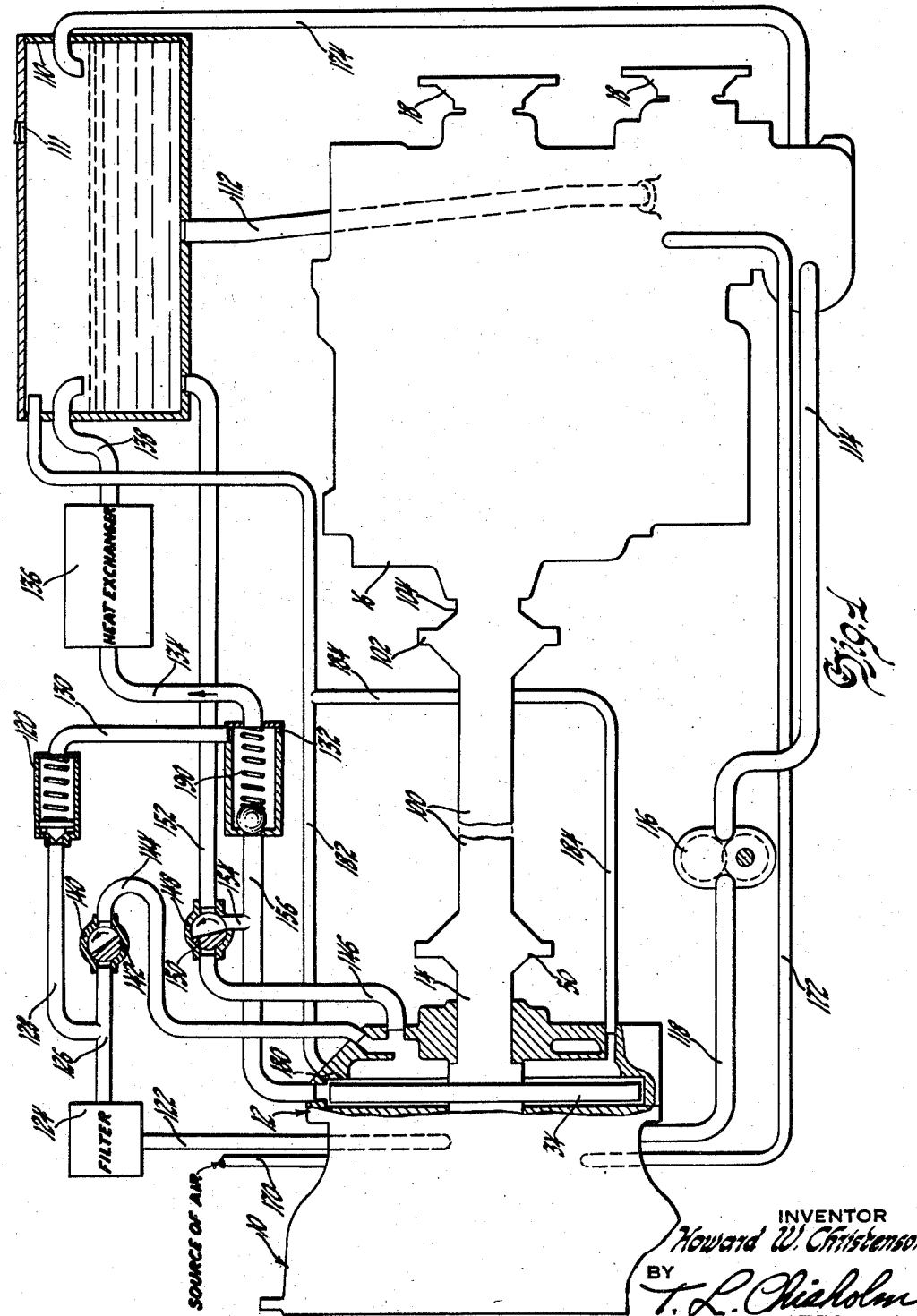

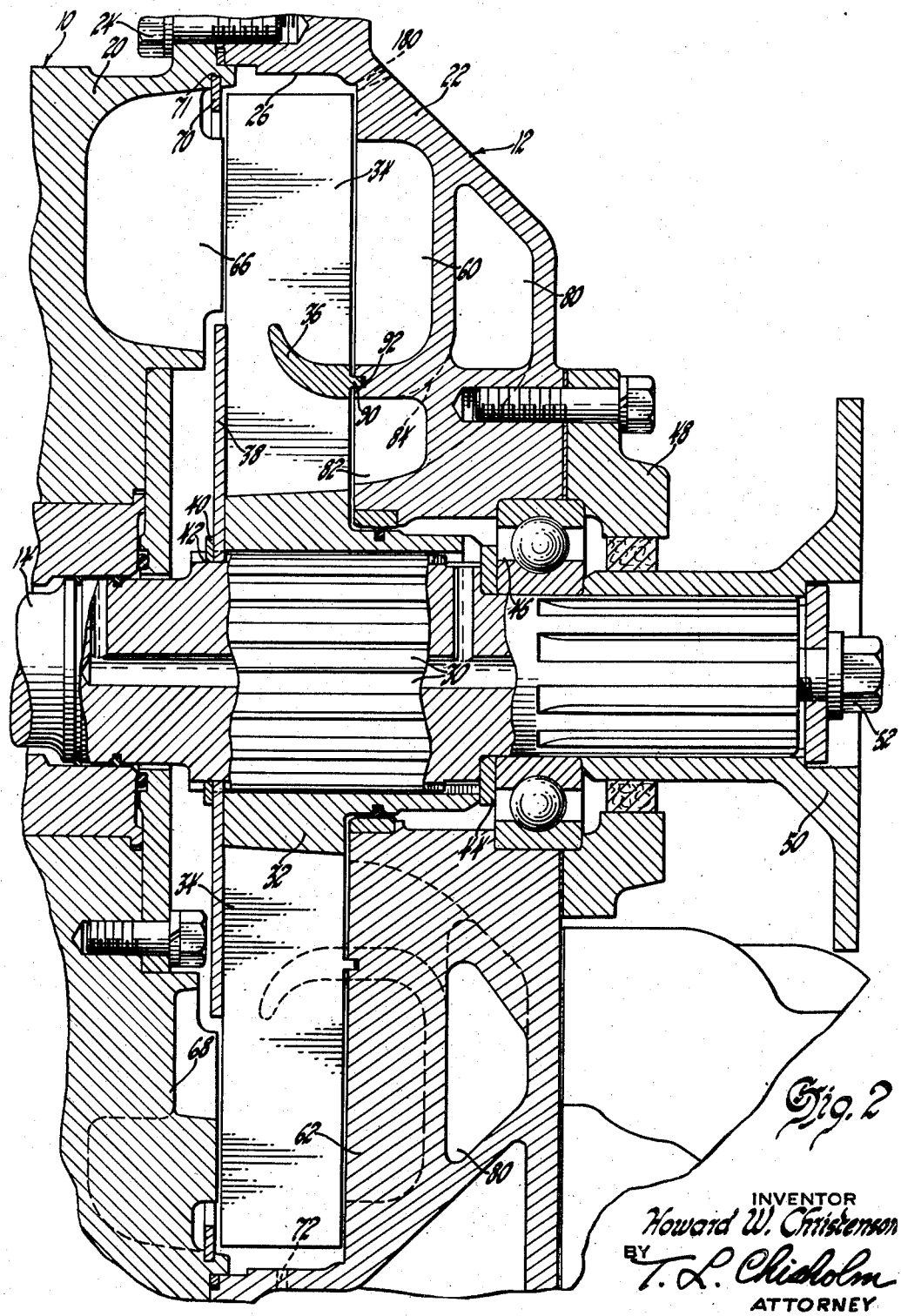

2,827,989

HYDRODYNAMIC DRIVE AND BRAKE

Howard W. Christenson, Indianapolis, Ind., assignor to General Motors Corporation, Detroit, Mich., a corporation of Delaware Application July 3, 1953, Serial No. 366,004

19 Claims. (Cl. 192—4)

This invention relates to hydrodynamic brakes and more particularly to such brakes for use in heavy duty vehicles.

In the operation of heavy vehicles, particularly those driven by internal combustion engines for road duty and also for off-the-road duty, the provision of adequate braking has been a problem. If reliance is placed on friction brakes of the character usually employed in automotive vehicles, the life thereof in such heavy duty service is relatively short and, in many instances, is of such short duration as to cause failure thereof during operation.

To overcome such inadequacy the present invention contemplates the use of a hydrodynamic brake so operated that the energy required for the braking effort is absorbed in liquid, from which it can be dissipated by any well-known heat exchange equipment. The braking effort is obtained by the movement of a rotor member in a confined body of liquid which can be circulated at such a rate as to control the braking effort and to dissipate the generated heat.

An object of the present invention is to provide a hydrodynamic brake of such simplified construction as to permit its use in conjunction with transmissions of various types associated with the road wheels of vehicles.

Another object of the invention is to provide a brake of the foregoing character in which the rotor acts as a centrifugal pump to draw liquid thereinto and to discharge the same from the enclosed housing.

Another object of the invention is to provide a brake as previously described in which the rotor member is mounted between two adjacent casing members, each of which is provided with a plurality of confronting pockets wherein liquid can be circulated in toroidal fashion due to the rotation of the rotor.

Another object of the invention is to provide a brake as previously described which has an outlet for the liquid utilized therein and a controlled inlet for such liquid, the inlet being designed to permit the entry of a greater quantity of liquid into the brake than can be discharged therefrom whereby the desired braking action can be accurately regulated.

A further object is to provide a brake as just described which is continuously exhausted, together with controls for admitting liquid thereto in such regulated volume that the action of the rotor can be accurately controlled from zero to maximum braking effort.

A still further object of the invention is to provide a brake construction wherein a part of the housing may constitute a part of a torque converter housing utilized in conjunction with the transmission of a vehicle.

A still further object of the invention is to provide a brake in which the rotor blades have interposed therebetween arcuate shaped webs which cooperate with a disk to form a restricted passage for liquid being expelled outwardly by rotation of the blades to enhance the pumping action thereof.

In carrying out the foregoing and other objects of the invention, a brake incorporating the same is made up of a housing having spaced walls, in the confronting surfaces of which are formed a plurality of pockets separated by radially extending webs. Rotatably mounted between these housing members is a plurality of relatively flat blades. These blades may be mounted on a hub member which can be splined to a shaft, the shaft in one form of the invention constituting the output shaft of a torque converter. The blades have the effective areas therebetween restricted near the hub so that liquid introduced into the blades adjacent the hub can be expelled outwardly with a centrifugal pump action. The blades extend radially outwardly beyond the outer edges of the pockets in the housing members so that the pump action can be maintained and braking effort prevented in the presence of a relatively small quantity of fluid in the casing. An outlet is provided for the liquid at the periphery of the brake, and preferably at the bottom thereof, which outlet serves to permit continuous exhaust of liquid from the brake at a rate depending upon the size of the outlet.

Liquid can be supplied to the brake in regulated volume by suitable valve arrangements, and such liquid can be supplied from the outlet of the torque converter or from a suitable reservoir and the entry of such liquid can be so regulated as to permit the introduction of a larger volume than can be exhausted, with the result that the casing can become so partially filled with liquid that rotation of the rotor blades and the shaft to which they are splined will be materially retarded. If this shaft is in driving association with the road wheels of a vehicle, either directly or through gearing, it follows that a brake action on the shaft will cause a corresponding brake action on the rotation of the vehicle wheels.

Other features, objects and advantages of the invention will become apparent by reference to the following detailed description of the accompanying drawings, wherein Fig. 1 is a schematic diagram of apparatus embodying the invention, and Fig. 2 is an enlarged vertical section through a part of the brake apparatus shown schematically in Fig. 1.

Figure 1 of the drawing illustrates schematically mechanism in which a brake embodying the invention is incorporated. This mechanism is of a type suitable to be employed intermediate a source of power such as an internal combustion engine, and the final drive shaft or shafts connected to apply traction to the wheels of a vehicle. The mechanism therefore consists of a torque converter 10 of any well-known type, which per se forms no part of this invention, a hydrodynamic brake 12 incorporating this invention, an intermediate drive shaft 14 which may be the output shaft of the torque converter 10 and which is operatively associated with the brake 12 and a transmission 16 of any well-known type which may have a single or twin output shafts with couplings 18. These couplings are for the purpose of connecting the output shafts of the transmission to a single or to twin propeller shafts utilized for providing the tractive connection to the rear wheels. Associated with these parts mentioned generally are a plurality of controls and accessory equipment which will be described in detail, and the operation thereof fully explained hereinafter.

The brake forming the present invention is shown in enlarged vertical section in Figure 2 and, as will be seen by reference to that figure, it is made up of a housing formed of two members 20 and 22. The member 20 may in this form of the invention be a part of the housing for the torque converter 10, and has secured thereto as by bolts 24 the housing member 22. Member 22 has a flange part 26 of such dimensions as to provide a space between confronting surfaces of the parts 20 and 22 of a suitable width for the mounting of rotor blades.

The output shaft 14 of torque converter 10 has a part thereof provided with splines 30 mating with splines formed in the interior surface of the hub 32. This hub 32 is provided with a plurality of flat radially extending blades 34 which may be of any desired number, such as, for example, fourteen, which number has been found in actual service to perform the desired operation satisfactorily. Blades 34 may be integral with the hub 32 or may be attached thereto by welding or riveting or any other suitable manner. A plurality of arcuately shaped members or webs 36 are positioned between each blade in spaced relation to the hub 32. These members, in addition to their cross-sectional curvature shown in the drawing, are so curved that they constitute in effect an interrupted ring; the interruptions being caused by the blades interposed between the ends of the members 36. These members may be secured to the blades in any suitable fashion or, if the blades are formed integrally with the hub, the members may also be of integral construction, since it is entirely possible that the entire assembly can be molded or cast in a single operation. A washer-like ring 38 surrounds a part of the shaft 14 and may be splined to this shaft, if desired, for rotation therewith and with the rotor made up of the hub and blades. This assembly of rotor and washer 38 may be held in place along the axis of the shaft 14 by means of a snap ring 40 fitting in groove 42 formed in the splines 30 of shaft 14 and an antifriction bearing assembly 46, which in turn is held in place by a ring member 48, bolted or otherwise secured to the housing member 22. This bearing assembly serves to support the output shaft 14 for rotation relative to the housing of the brake, and the shaft is further extended for the attachment of a splined coupling member 50, held in place by a stud 52 threaded into the end of the shaft 14.

Brake housing member 22 is provided with a plurality of pockets 60 located between radially extending webs 62, and these pockets are so disposed that the inner edges thereof are spaced a suitable distance from the hub 32, while the outer edges thereof terminate short of the outer ends of the blades 34. Since the pockets are located between the radial ribs 62, it follows that the pockets have generally truncated wedge shape. These pockets may be of any desired number, but in the practice of the invention, sixteen have been found to produce efficient results in cooperation with the fourteen blades of the rotor. The brake housing member 20 which, as before mentioned, may be a part of the torque converter housing, likewise has a plurality of pockets 66 formed between radial ribs 68 of generally similar shape to the pockets 60 and of number to cooperate with the rotor blades. However, it will be noted that the outer extremities of these pockets 66 extend beyond the ends of the blades 34. To insure a pump action of the rotor in the presence of a relatively small quantity of liquid, use may be made of a snap ring 70 positioned in a groove 71 formed in member 20. The snap ring 70 may extend completely around the member 20 or may be of limited length, being positioned between a pair of ribs adjacent an outlet 72 formed in the peripheral surface of the flange 26. In the preferred form of the invention, the outlet 72 will be at the bottom of the brake housing, though in the schematic showing of Figure 1 a liquid line connection for outlet purposes has been shown as being attached to the top of the housing.

Brake housing member 22 is provided with openings forming an inlet manifold 80 in communication with a supply inlet 82 immediately adjacent the periphery of the hub 32 of the rotor. Multiple communication channels are shown in dotted lines at 84, extending between the manifold opening 80 and the supply opening 82. Liquid supply line connections to this manifold may be made in any suitable fashion.

The edges of the webs 36 form an annular ring which is machined with a labyrinth seal 90 which registers with groove 92 formed in housing member 20 for restricting fluid recirculation through the center pump section of the rotor.

Liquid seals of various types have been shown in Figure 2, being located advantageously for the prevention of the escape of liquid at any point at which such action would be detrimental to the proper functioning of the device. Inasmuch as the number and disposition of such seals are largely a matter of choice, a detailed description thereof has been omitted. Likewise channels for the passage of lubrication oil have been shown in shaft 14, and it will be obvious that other passages may be employed without necessity for detailed description.

Referring now to Figure 1, it will be seen that the coupling 50, previously mentioned, is connected to an intermediate shaft 100, which in turn is coupled by coupling 102 to transmission input shaft 104 extending into the transmission housing 16. Inasmuch as the particular transmission enclosed by housing 16 forms no part of the invention, illustration thereof has been omitted.

For the successful operation of the brake of this invention, it is deemed necessary to provide a liquid reservoir 110 located above the top of the brake housing 12 so that liquid such as oil may be fed by gravity to various parts of the mechanism. Reservoir 110 is provided with a fill and vent opening 111. For example, one line 112 extends to the transmission housing 16 to provide the same with lubrication and to furnish the necessary oil for the operation of hydraulic mechanism and the like if the same be included in the transmission. An oil line 114, attached near the bottom of the transmission housing, leads to a pump 116 which operates to supply oil through line 118 to the torque converter 10. The pressure of the work circuit in the torque converter 10 is determined by a check valve 120 connected to an outlet line 122, through a filter 124, line 126 and branch line 128. Oil can leave the check valve 120 through line 130 to one end of a check valve 132 and thence through line 134 to a heat exchanger 136 of any well-known type, from which the cooled oil passes through line 138 into the reservoir 110.

Line 126 from the filter 124 extends to a port in valve casing 140 having a valve 142 therein. Another port of the body 140 is connected by line 144 to the inlet manifold of the brake. A second line 146, also connected to this inlet manifold, is connected to a port of valve body 148 having valve 150 rotatable therein. Valve body 148 is provided with a second port connected to a pipe line 152 which leads to a reservoir 110. This same valve body is also provided with a third port connected to a branch line 154 of line 156, one end of which is connected to the outlet 72 of the brake and the other end of which is connected to the check valve 132. While outlet 72 preferably is located at the bottom of the brake housing, for purposes of simplicity in the flow chart line 156 has been shown connected to the top of the housing.

Air under pressure from a suitable source is introduced into the converter through a small restriction orifice in line 170 for the purpose of scavenging or expelling residual oil from the converter housing, which purpose is accomplished by the outlet line 172 extending from the converter to the transmission housing 16. The air thus introduced to this transmission housing 16 can serve to scavenge excess oil from the housing, which is discharged therefrom through the line 174 extending to the top of reservoir 110 above the liquid level thereof.

The brake is provided with a passage 180 near the periphery thereof, and preferably at the top thereof, which is connected to a pipe 182 extending to the top of the reservoir 110 into the air space above the liquid therein. Another pipe line 184, connected to line 182, is connected to the brake housing near the hub of the rotor for a purpose to be explained later.

The operation of this brake is substantially as follows. The valve members 142 and 150 may be mounted on the same stem or may be operated by actuation of a single mechanism in such fashion that they rotate in unison. In the off or released condition of the brake, the two-part valve 142, 150 will be in the position shown in Figure 1. The part 142 blocks line 126 so that oil from the torque converter 10 must pass through the branch 128 and the check valve 120. The setting of this check valve, as before mentioned, determines the working pressure in the converter, permitting the exhaust of oil from the converter when this working pressure is exceeded. This exhaust oil passes through line 130, a part of check valve 132, then through line 134 to the heat exchanger 136 where it is cooled and finally discharged into the reservoir 110. At the same time the part 150 of the valve 148 is in the position shown in Figure 1, blocking the line 146 communicating with the brake inlet manifold, but permitting communication between the branch 154 and the line 152. Thus, any oil which may be present in the brake housing due to leakage from valves or any other source will be expelled therefrom by rotation of the blades of the rotor through the line 156, branch 154 and line 152 into the liquid reservoir. The check valve 132 is of such strength as to compel this action since the spring thereof, 190, is aided to some extent by the oil exhausted from the torque converter.

With the valve parts 142 and 150 in the position shown in Figure 1, the rotor of the brake which rotates with the output shaft of the torque converter, and hence with the transmission input shaft, will be rotated, but due to the absence of any material amount of oil in the brake housing, will perform no useful function other than that of maintaining a constant discharge of any oil from the brake.

Assuming that the vehicle having this installation therein is in motion and that the operator thereof desires to arrest such motion, this result can be accomplished with a nicety of control by means of the two-part valve 142, 150. To apply the brake, i. e., to cause it to arrest motion of the road wheels through the transmission and the intermediate shaft 100 and shaft 14, the valve is moved counterclockwise through an initial stage, as a result of which the part 150 closes the port connected to the branch line 154. Part 142, which must rotate in unison with part 150, will be moved an amount sufficiently to open the port connected to line 126 to a slight degree. This latter movement permits oil discharged from the converter to be immediately introduced into the brake through line 144 which communicates with the manifold 80 and the inlet chamber 82. As soon as this oil enters the space between the blades 34 near the hub thereof, rotation of these blades will cause the oil to be moved outwardly under centrifugal force in the manner of a centrifugal pump, and this pump action is increased by the restricted passages formed by the arcuate members 36 and the disk 38. The oil immediately is forced out to the periphery of the brake housing and, if the quantity thereof is such that it can be discharged through the outlet 72 without building up a radial depth greater than that determined by the snap ring 70 and the wall of the part 22 radially outward of the pockets 60, the action of the rotor will be that of a pump since the liquid being pumped by this rotor offers a negligible amount of resistance to rotation of the rotor.

Continued counterclockwise movement of the valve parts 142 and 150 increases the opening of line 126 so that an increased volume of the oil discharged from the converter may be introduced into the brake. However, it will be noted that prior to complete opening of line 126, line 146 has been placed in communication with line 152 so that oil from the reservoir 110 can also be introduced into the brake inlet manifold. This arrangement is provided for the purpose of assuring an adequate quantity of oil for braking purposes which might not be supplied from the torque converter. As the oil is made available at the inlet manifold, rotation of the rotor of the brake in its pump-like action will immediately draw the same into the brake and discharge it outwardly toward the periphery of the brake housing. If the introduced volume of oil exceeds the outlet capacity, the depth of the body of oil will immediately begin to be increased radially inwardly from the periphery of the brake and, as the depth thereof increases, the braking action likewise is increased since, as soon as this depth exceeds the inner edges of the snap ring 70 and the outer edges of pockets 60, the oil will be forced into the pockets 66 and 60 and will be circulated inwardly in the pockets to again be forced into the blades of the rotor and moved outwardly, thereby establishing two toroidal circuits. This movement of the oil opposes rotation of the rotor blades and hence serves to decelerate the rotor and the shaft upon which it is mounted. Braking action for the vehicle thereby is obtained.

When the valve parts 142 and 150 have been so moved as to completely clear the ports connected to lines 126 and 146, the volume of oil available for the brake will so exceed the discharge capacity thereof that the depth of oil in the brake can be increased radially inwardly until the blades are substantially completely filled, in which condition maximum braking effort is obtained.

The oil which is discharged from the brake is compelled to pass through the check valve 132 and the heat exchanger 136 and is returned through the line 138 to the reservoir 110. The heat generated in the oil by the circulation thereof in the brake is largely dissipated before the oil is available for reuse.

While the supply of oil from the torque converter to the brake seemingly bleeds the converter, no undesired results are obtained since, when braking of the vehicle is desired, the function of the torque converter to drive the vehicle becomes unnecessary. Should the oil supplied to the torque converted be of such volume and the valve part 142 be in such position as to partially block line 126, oil can still be exhausted from the converter through the check valve 120 as in brake release condition to limit the work pressure in the converter.

The air lines 182 and 184 are for the purpose of venting the brake under certain conditions. Since the line 182 is connected to the vent 180 near the periphery of the brake housing, any air in the housing can be forced therefrom to permit rapid filling of the housing with oil. The line 184 being connected to the housing near the inner portion of the brake chamber permits the central portion of the rotor to breathe, thereby to permit air to escape from this central portion when the brake is being exhausted.

Exhaust of the brake occurs when the parts of the valve are returned to the Figure 1 position, immediately cutting off supply of oil to the inlet manifold and thereby permitting any oil in the brake chamber to be forced therefrom by rotation of the rotor. When the valve parts are restored to the Figure 1 position, the oil being pumped from the brake chamber may return to the reservoir either through the check valve 132 or through the line 152.

Referring to Figure 2, it will be seen that the inner diameter of ring 70 is larger than the maximum diameter of pockets 60. Thus, when the depth of the liquid body in the chamber is increased during the application of the brake, it follows that circulation of a toroidal nature will occur in the pockets 66 before a similar circulation will take place in the pockets 60. This difference in boundary edges of the pockets aids in the controlled application of the brake by the establishment of one toroidal circuit prior to the establishment of the other. By extending the rotor blades beyond the pockets, pumping action by these blades to force oil from the brake chamber is established prior to initiation of braking action, and as long as the volume of fluid is small, very little energy is expended. The snap ring need not extend completely around the casing to insure pumping action to the outlet, but may be a short expanse of arc shape adjacent the outlet for this purpose. The present arrangement, in which oil is continuously forced from the brake chamber, assures that even during the application of the brake oil will be returned to the reservoir through the heat exchanger so that overheating of oil in the brake chamber is prevented, which might occur if the fluid was not circulated in the manner described.

While the brake housing has been shown as being made up of a part of the torque converter housing, i. e., the part 20, this arrangement is of convenience particularly in installations incorporating a torque converter. Likewise the controls for the particular brake have been shown coordinated with the operation of the torque converter so that oil discharged from the converter can be used in the immediate application of the brake. However, it will be evident to those skilled in the art that the brake can be constructed entirely apart from a torque converter and operated in conjunction with any type of vehicle transmission regardless of whether or not a hydrodynamic drive device is included. The housing for the brake in such an instance can be made of two complementary parts which can be located in any suitable position relative to the frame or engine of a vehicle so long as the brake housing is held against rotation. It will further be obvious that a single valve, such as that part shown as having member 150 incorporated therein, could be used alone for the purpose of controlling the supply of oil to the brake, in which event the connection to the torque converter outlet would be unnecessary.

From the foregoing it will be seen that the present invention provides a new, simple and efficient hydrodynamic brake in which the rotor has an action quite similar to that of a centrifugal pump in some phases of operation, and which serves not only to circulate liquid through and out of the brake chamber, but also serves to circulate the same in toroidal paths within the chamber. In this manner efficient deceleration of the rotor can be accomplished, with the energy expended in such action being dissipated through the agency of the circulated liquid. It will be understood that the invention is capable of modifications beyond the illustrated embodiment and, accordingly, any limitations to be imposed thereupon are those set forth in the following claims.

What is claimed is:

1. A hydrodynamic brake comprising a casing, a shaft passing therethrough, the spaced opposite walls of said casing being provided with confronting axially extending pockets, a rotor secured to said shaft and having radially extending blades rotatable in the space between said confronting pockets, said blades being substantially flat and having substantially uninterrupted surfaces over the radial outer portions thereof, said uninterrupted surfaces extending across the space between said pockets, said casing being provided with a liquid inlet near the inner ends of said blades and a liquid outlet near the outer ends of said blades, and means for so controlling liquid circulation through said casing as to regulate the braking effect of liquid in the casing upon the rotation of said rotor blades.

2. A hydrodynamic brake comprising a shaft passing therethrough, the spaced opposite walls of said casing being provided with confronting axially extending pockets, a rotor secured to said shaft and having radially extending blades rotatable in the space between said confronting pockets, said blades being substantially flat and having substantially uninterrupted surfaces over the radial outer portions thereof, said uninterrupted surfaces extending across the space between said pockets, said casing being provided with a liquid inlet near the inner ends of said blades and a restricted liquid outlet near the outer ends of said blades whereby liquid can enter the casing faster than it can be exhausted therefrom, and means for so controlling liquid circulation through said casing as to regulate the volume of liquid in the casing thereby to regulate the braking effect of liquid in the casing upon the rotation of said rotor blades.

3. A hydrodynamic brake comprising a casing, a shaft passing therethrough, the spaced opposite walls of said casing being provided with confronting axially extending pockets, a rotor secured to said shaft and having radially extending blades rotatable in the space between said confronting pockets, said casing being provided with a liquid inlet near the inner ends of said blades and a liquid outlet near the outer ends of said blades, and means for so controlling liquid flow through said casing as to regulate the braking effect of liquid circulated in said pockets by the rotation of said rotor blades, said casing having walls between which the outer end portions of said blades rotate with the blade edges in close proximity to said walls whereby said rotor pumps liquid out of said casing before braking circulation is established.

4. A hydrodynamic brake comprising a casing, a shaft passing therethrough, the spaced opposite walls of said casing being provided with confronting axially extending pockets, a rotor secured to said shaft and having radially extending pump blades rotatable in the space between said confronting pockets, said casing being provided with a liquid inlet near the inner ends of said blades and a liquid outlet near the outer ends of said blades, and means for so controlling liquid flow through said casing as to regulate the braking effect of liquid circulated in said pockets by the rotation of said rotor blades, said rotor having restricted substantially radially extending passages between said blades intermediate the inner and outer ends thereof to increase the pumping action of said blades on liquid entering the spaces between said blades at the inner ends thereof.

5. A hydrodynamic brake comprising a casing, a shaft passing therethrough, the spaced opposite walls of said casing being provided with confronting axially extending pockets, a rotor secured to said shaft and having radially extending pump blades rotatable in the space between said confronting pockets, said casing being provided with a liquid inlet near the inner ends of said blades and a liquid outlet near the outer ends of said blades, and means for so controlling liquid flow through said casing as to regulate the braking effect of liquid circulated in said pockets by the rotation of said rotor blades, a radially extending disk lying against one edge of each of said blades at the inner ends of said blades, arcuate shaped webs between said blades intermediate the ends thereof, and extending toward said disk to form restricted passages for fluid thereby to increase pumping action of said blades.

6. A hydrodynamic brake comprising a casing, a shaft passing therethrough, the spaced opposite walls of said casing being provided with confronting axially extending pockets, a rotor secured to said shaft and having radially extending blades rotatable in the space between said confronting pockets, said casing being provided with a liquid inlet near the inner ends of said blades and a liquid outlet near the outer ends of said blades, a reservoir for liquid, means for so controlling liquid circulation through said casing as to regulate the braking effect of liquid in the casing upon the rotation of said rotor blades, said means including a valve in one position establishing communication between said reservoir and said inlet, and alternative paths between said outlet and said reservoir, one of said alternative paths having said valve therein, at least one of said paths being available for the passage of liquid in any position of said valve.

7. A hydrodynamic brake comprising a casing, a shaft passing therethrough, the spaced opposite walls of said casing being provided with confronting axially extending pockets, a rotor secured to said shaft and having radially extending blades rotatable in the space between said confronting pockets, said casing being provided with a liquid inlet near the inner ends of said blades and a liquid outlet near the outer ends of said blades, a reservoir for liquid, means for so controlling liquid circulation through said casing as to regulate the braking effect of liquid in the casing upon the rotation of said rotor blades, said means including a valve in one position establishing communication between said reservoir and said inlet, and alternative paths between said outlet and said reservoir, one of said alternative paths having said valve therein, at least one of said paths being available for the passage of liquid in any position of said valve and a heat exchanger in one of said paths between said outlet and said reservoir.

8. A hydrodynamic brake comprising a casing, a shaft passing therethrough, the spaced opposite walls of said casing being provided with confronting axially extending pockets, a rotor secured to said shaft and having radially extending blades rotatable in the space between said confronting pockets, said blades being substantially flat and having substantially uninterrupted surfaces over the radial outer portions thereof, said uninterrupted surfaces extending across the space between said pockets, a reservoir for liquid, said casing being provided with a liquid inlet near the inner ends of said blades and a liquid outlet near the outer ends of said blades, said inlet being radially inward of said pockets, means for maintaining said outlet in communication with said reservoir, and valve means for so controlling the supply of liquid to said inlet as to regulate the braking effect of liquid in the casing upon the rotation of said rotor blades.

9. A hydrodynamic brake comprising a casing, a shaft passing therethrough, the spaced opposite walls of said casing being provided with confronting axially extending pockets, a rotor secured to said shaft and having radially extending blades rotatable in the space between said confronting pockets, said blades being substantially flat and having substantially uninterrupted surfaces over the radial outer portions thereof, said uninterrupted surfaces extending across the space between said pockets, a reservoir for liquid, said casing being provided with a liquid inlet near the inner ends of said blades and a liquid outlet near the outer ends of said blades, said inlet being radially inward of said pockets, means for maintaining said outlet in communication with said reservoir, and valve means for so controlling the supply of liquid to said inlet as to regulate the braking effect of liquid in the casing upon the rotation of said rotor blades, said inlet having a larger liquid capacity than said outlet whereby said casing can be filled under the control of said valve means.

10. A hydrodynamic brake comprising a casing, a shaft passing therethrough, the spaced opposite walls of said casing being provided with confronting axially extending pockets, the pockets in one of said walls extending closer to the periphery of said casing than the pockets in the other wall, a rotor secured to said shaft and having radially extending blades rotatable in the space between said confronting pockets, said casing being provided with a liquid inlet near the inner ends of said blades and a liquid outlet near the outer ends of said blades, said casing having walls between which the outer end portions of said blades rotate with the blade edges in close proximity to said walls to force liquid from said casing through said outlet, and valve means for controlling liquid supply to said inlet to regulate the braking effect of liquid in the casing upon the rotation of said rotor blades.

11. A hydrodynamic brake comprising a casing, a shaft passing therethrough, the spaced opposite walls of said casing being provided with confronting axially extending pockets, the pockets in one of said walls extending closer to the periphery of said casing than the pockets in the other wall, a rotor secured to said shaft and having radially extending blades rotatable in the space between said confronting pockets, said casing being provided with a liquid inlet near the inner ends of said blades and a liquid outlet near the outer ends of said blades, said casing having walls between which the outer end portions of said blades rotate with the blade edges in close proximity to said walls to force liquid from said casing through said outlet, and valve means for controlling liquid supply to said inlet to regulate the braking effect of liquid in the casing upon the rotation of said rotor blades, said outlet being continuously open for exhausting fluid, said inlet having a greater capacity than said outlet whereby the degree of filling of said casing can be controlled.

12. In a vehicle having hydrodynamic drive device enclosed in a casing and having a liquid inlet and a liquid outlet, a hydrodynamic brake associated therewith and having a chamber formed by a wall of said drive device casing and a spaced complementary wall, a drive shaft extending from said drive device through said chamber and having rotor blades secured thereto for rotation between said walls, said walls having confronting pockets on each side of said blades whereby rotation of the blades in liquid will establish toroidal paths of movement of the liquid, a reservoir for liquid, an outlet for liquid near the outer ends of said blades, an inlet for liquid near the inner ends of said blades, said brake outlet being connected to said reservoir for discharge of liquid from said brake into said reservoir, and means for supplying liquid to said brake inlet including in part a valved line connected to the outlet of said hydrodynamic drive device.

13. In a vehicle having hydrodynamic drive device enclosed in a casing and having a liquid inlet and a liquid outlet, a hydrodynamic brake associated therewith and having a chamber formed by a wall of said drive device casing and a spaced complementary wall, a drive shaft extending from said drive device through said chamber and having rotor blades secured thereto for rotation between said walls, said walls having confronting pockets on each side of said blades whereby rotation of the blades in liquid will establish toroidal paths of movement of the liquid, a reservoir for liquid, an outlet for liquid near the outer ends of said blades, an inlet for liquid near the inner ends of said blades, said brake outlet being connected to said reservoir for discharge of liquid from said brake into said reservoir, and means for supplying liquid to said brake inlet including in part a valved line connected to the outlet of said hydrodynamic drive device and a valve controlled passage between said inlet and said reservoir.

14. In a vehicle having hydrodynamic drive device enclosed in a casing and having a liquid inlet and a liquid outlet, a hydrodynamic brake associated therewith and having a chamber formed by a wall of said drive device casing and a spaced complementary wall, a drive shaft extending from said drive device through said chamber and having rotor blades secured thereto for rotation between said walls, said walls having confronting pockets on each side of said blades whereby rotation of the blades in liquid will establish toroidal paths of movement of the liquid, a reservoir for liquid, an outlet for liquid near the outer ends of said blades, an inlet for liquid near the inner ends of said blades, said brake outlet connected to said reservoir for discharge of liquid from said brake into said reservoir, and means for supplying liquid to said brake inlet including in part a valved line connected to the outlet of said hydrodynamic drive device, a valve controlled passage between said inlet and said reservoir and a heat exchanger connected between said outlet and said reservoir, said last mentioned valve compelling liquid discharged from said brake while said reservoir is in communication with said brake inlet to pass through said heat exchanger.

15. In a vehicle having a hydrodynamic drive device enclosed in a casing, a liquid inlet for said device, a liquid outlet for said device, a hydrodynamic brake associated with said device, said brake having a liquid inlet and a liquid outlet, valve means for establishing communication between the outlet for said device and the inlet for said brake whereby liquid can be discharged by said device into said brake to activate said brake with decrease in driving effort by said device.

16. In a vehicle having a hydrodynamic drive device enclosed in a casing, a liquid inlet for said device, a liquid outlet for said device, a valve for limiting the pressure of liquid in said device, a hydrodynamic brake associated with said device, said brake having a liquid inlet and a liquid outlet, valve means for establishing communication between the outlet for said device and the inlet for said brake whereby liquid can be discharged by said device into said brake to activate said brake with reduction in liquid pressure in said device and decrease in driving effort by said device.

17. In a vehicle having a hydrodynamic drive device enclosed in a casing, a shaft driven by said device, a liquid inlet for said device, a liquid outlet for said device, a valve for limiting the pressure of liquid in said device, a hydrodynamic brake associated with said device, said brake having an element driven by said shaft, said brake having a liquid inlet and a liquid outlet, valve means for establishing communication between the outlet for said device and the inlet for said brake whereby liquid can be discharged by said device into said brake to activate said brake with reduction in liquid pressure in said device and decrease in driving effort by said device.

18. In a vehicle having a hydrodynamic drive device enclosed in a casing, a liquid inlet for said device, a liquid outlet for said device, a valve connected to the outlet for said device, said valve limiting the pressure of liquid in said device, a hydrodynamic brake associated with said device, said brake having a liquid inlet and a liquid outlet, valve means for establishing communication between the outlet for said device and the inlet for said brake, said valve means being connected to the outlet for said device between the casing thereof and said pressure limiting valve whereby liquid can be discharged by said device into said brake to activate said brake with reduction of liquid pressure in said device and decrease in driving effort by said device.

19. In a vehicle having a hydrodynamic drive device enclosed in a casing, a shaft driven by said device, a liquid inlet for said device, a liquid outlet for said device, a valve connected to the outlet for said device, said valve limiting the pressure of liquid in said device, a hydrodynamic brake associated with said device, said brake having an element driven by said shaft, said brake having a liquid inlet and a liquid outlet, valve means for establishing communication between the outlet for said device and the inlet for said brake, said valve means being connected to the outlet for said device between the casing thereof and said pressure limiting value whereby liquid can be discharged by said device into said brake to activate said brake with reduction of liquid pressure in said device and decrease in driving effort by said device.

References Cited in the file of this patent

UNITED STATES PATENTS

| | | |
|---|---|---|
| 1,915,547 | North et al. | June 27, 1933 |
| 2,170,128 | De La Mater | Aug. 22, 1939 |
| 2,189,189 | Bennett | Feb. 6, 1940 |
| 2,425,171 | Bennett et al. | Aug. 5, 1947 |
| 2,452,550 | Cline | Nov. 2, 1948 |
| 2,634,830 | Cline | Apr. 4, 1953 |
| 2,672,953 | Cline | Mar. 23, 1954 |

FOREIGN PATENTS

| | | |
|---|---|---|
| 537,867 | Germany | Nov. 7, 1931 |